United States Patent
Kim (10) Patent No.: US 9,061,660 B2
(45) Date of Patent: Jun. 23, 2015

(54) DEVICE FOR CLEANSING DOOR GLASS OF VEHICLE

(71) Applicant: Hyundai Motor Company, Seoul (KR)

(72) Inventor: Shee Yun Kim, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/105,068

(22) Filed: Dec. 12, 2013

(65) Prior Publication Data

US 2015/0082572 A1    Mar. 26, 2015

(30) Foreign Application Priority Data

Sep. 23, 2013  (KR) .......................... 10-2013-0112601

(51) Int. Cl.
*B60S 1/56* (2006.01)
*E06B 7/00* (2006.01)
*B60J 1/20* (2006.01)

(52) U.S. Cl.
CPC ... *B60S 1/56* (2013.01); *E06B 7/00* (2013.01); *B60J 1/2094* (2013.01)

(58) Field of Classification Search
CPC ............ B60S 1/02; B60S 1/04; B60S 1/0402; B60S 1/0411; B60S 1/0466; B60S 1/56
USPC ........... 49/212, 215, 216, 218, 219, 372, 374, 49/376, 377; 15/250.1
See application file for complete search history.

(56) References Cited

U.S. PATENT DOCUMENTS

| | | | | |
|---|---|---|---|---|
| 2,743,472 A | * | 5/1956 | Alef | 15/250.1 |
| 2,936,476 A | * | 5/1960 | Ziegler | 15/250.02 |
| 3,161,901 A | * | 12/1964 | Kolb et al. | 15/250.02 |
| 3,362,236 A | * | 1/1968 | Druseikis | 74/76 |
| 3,686,705 A | * | 8/1972 | Parker et al. | 15/250.01 |
| 3,837,032 A | * | 9/1974 | Ulbrich | 15/250.17 |
| 4,719,661 A | * | 1/1988 | Hanselmann | 15/250.203 |
| 4,730,414 A | * | 3/1988 | Nakamura et al. | 49/348 |
| 4,785,582 A | * | 11/1988 | Tokue et al. | 49/211 |
| 4,833,373 A | * | 5/1989 | Doi et al. | 318/114 |
| 4,956,942 A | * | 9/1990 | Lisak et al. | 49/502 |
| 5,253,453 A | * | 10/1993 | Maass et al. | 49/377 |

FOREIGN PATENT DOCUMENTS

| | | |
|---|---|---|
| JP | 2008-55953 A | 3/2008 |
| KR | 10-0680786 B1 | 2/2007 |
| KR | 10-2010-0000271 A | 1/2010 |

* cited by examiner

*Primary Examiner* — Katherine Mitchell
*Assistant Examiner* — Catherine A Kelly
(74) *Attorney, Agent, or Firm* — Morgan, Lewis & Bockius LLP (57) ABSTRACT

A device for cleansing vehicle door glass to stably secures a driver's view by raising and lowering the door glass and effectively removing a glass contaminant. The device may include a carrier plate coupled with a glass module of a vehicle door, a guide rail, to which the carrier plate is coupled for guiding upward and downward movement, a rail pushing module coupled to a door inner panel while closely contacting an upper portion of the guide rail, for selectively pushing the guide rail toward a door outer panel or pulling the guide rail to return the guide rail, a regulator which moves the carrier plate upward and downward with a wire connected with the carrier plate, and a clean protrusion which protrudes toward an inside of the door from a center portion of an outbelt attached to an upper end of the door outer panel.

5 Claims, 7 Drawing Sheets

DEVICE FOR CLEANSING DOOR GLASS OF VEHICLE

CROSS-REFERENCE TO RELATED APPLICATION

The present application claims priority of Korean Patent Application Number 10-2013-0112601 filed on Sep. 23, 2013, the entire contents of which application are incorporated herein for all purposes by this reference.

BACKGROUND OF INVENTION

1. Field of Invention

The present disclosure relates to a device for cleansing door glass of a vehicle to effectively remove a contaminant of the door glass.

2. Description of Related Art

Generally, a vehicle includes doors for getting on and off the vehicle and door glass that may be opened and closed is installed in the doors. As the door glass descends, it is concealed inside a lower frame, and as the door glass ascends, it is exposed from the lower frame to open or close an upper portion of the door.

In driving of the vehicle, a driver checks external conditions through front windshield, rear windshield, door glass, room mirror, and side mirror. If the view of the door glass is difficult to secure due to rainwater in case of rain, the driver has difficulty in checking external conditions reflected by the side mirror as well as left and right sides of the vehicle, hindering safety driving.

For these reasons, to make it easy to secure the driver's view in case of rain, the door glass is generally subject to water repellent finish. However, in case of air contamination due to yellow dust, it is difficult to secure the water repellent finish function. That is, if the door glass is stained with a contaminator, it is difficult to secure view of the side mirror as well as the door glass.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, various aspects of the present invention provide a device for cleansing door glass of a vehicle to stably secure view of a driver by effectively removing a glass contaminator simultaneously with ascent of the door glass.

According to various aspects of the present invention, there is provided a device for cleansing door glass of a vehicle. The device may include a carrier plate coupled with a glass module of a door of the vehicle, a guide rail, to which the carrier plate is coupled, for guiding upward and downward movement of the carrier plate, a rail pushing module, a side of which is coupled to a door inner panel while closely contacting an upper portion of the guide rail, for selectively pushing the guide rail toward a door outer panel or pulling the guide rail to return the guide rail, a regulator which moves the carrier plate upward and downward with a wire connected with the carrier plate, and a clean protrusion which protrudes toward an inside of the door from a center portion of an outbelt attached to an upper end of the door outer panel.

The rail pushing module may include a mounting bracket including a bent portion which is coupled to the door inner panel, closely contacts the upper portion of the guide rail, and has a space with the door inner panel, an electromagnet which is fixedly installed inside the bent portion and is applied with a current of a predetermined direction in a glass cleansing mode, and a mounting hook, a side of which is attached to the upper portion of the guide rail and the other side of which is engaged with, by passing through, the bent portion, the mounting hook having characteristics of a magnetic polarity.

Polarities of both sides of the electromagnet may be changed in response to the direction of current applied through an electromagnetic driving wire, and the electromagnetic driving wire may change the direction of the current applied to a coil of the electromagnet according to a user-selected mode.

The rail pushing module may include a mounting bracket including a bent portion which is coupled to the door inner panel, closely contacts the upper portion of the guide rail, and has a space with the door inner panel, a crosslink including a pair of arms that are connected to intersect each other and to be extended and returned left or right, the crosslink being installed inside the bent portion, and a link driving wire attached to a lower end of an arm of the cross link and pulled by the regulator in the cleansing mode.

The rail pushing module may further include a return spring which is installed between the crosslink and the door inner panel to restore the extended crosslink and a link guide rail installed in the door inner panel and the mounting bracket to support and guide operations of the crosslink.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A door of a vehicle has a space for receiving door glass between a door inner panel and a door outer panel and installing a regulator assembly for ascending and descending the door glass.

The regulator assembly includes a carrier plate directly coupled to a lower portion of the door glass, a guide rail for guiding ascent and descent of the carrier plate, and a rail guide installed in the carrier plate to couple the carrier plate to the guide rail such that the carrier plate may move up and down. Also, a regulator including a motor that operates with an electric signal input from a switch once the switch installed in a door trim of the vehicle is manipulated by a driver and a passenger, and a driving wire connecting the regulator to the carrier plate are provided.

The device for cleansing door glass of a vehicle according to the present invention raises or lowers the door glass and effectively removes a contaminant of the door glass based on the foregoing structure. Thus, in the present invention, a descending/ascending mode of a door glass 161 (or door glass regulator) is divided into a general mode and a glass cleansing mode (see FIG. 1).

For example, a glass manipulation unit installed in the door trim includes a general-mode switch and a cleansing-mode switch to allow the driver and the passenger to select the general mode or the cleansing mode as the ascending/descending mode of the door glass.

In the present invention, in the glass cleansing mode, the door glass 161 is raised or lowered while being tilt toward the exterior to cause the door glass 161 to contact a clean protrusion 151 of an outbelt 150, such that contamination may be removed simultaneously with ascent and descent of the door glass 161.

In various embodiments of the present invention, the door glass is tilt toward the exterior (that is, the door outer panel) using an electromagnet that generates magnetism with supplied power. In various other embodiments of the present invention, the door glass is tilt toward the exterior through a cross link operating with a wire.

Hereinafter, the present invention will be described in detail with reference to the accompanying drawings to allow those of ordinary skill in the art to easily carry out the present invention.

Figure 1:
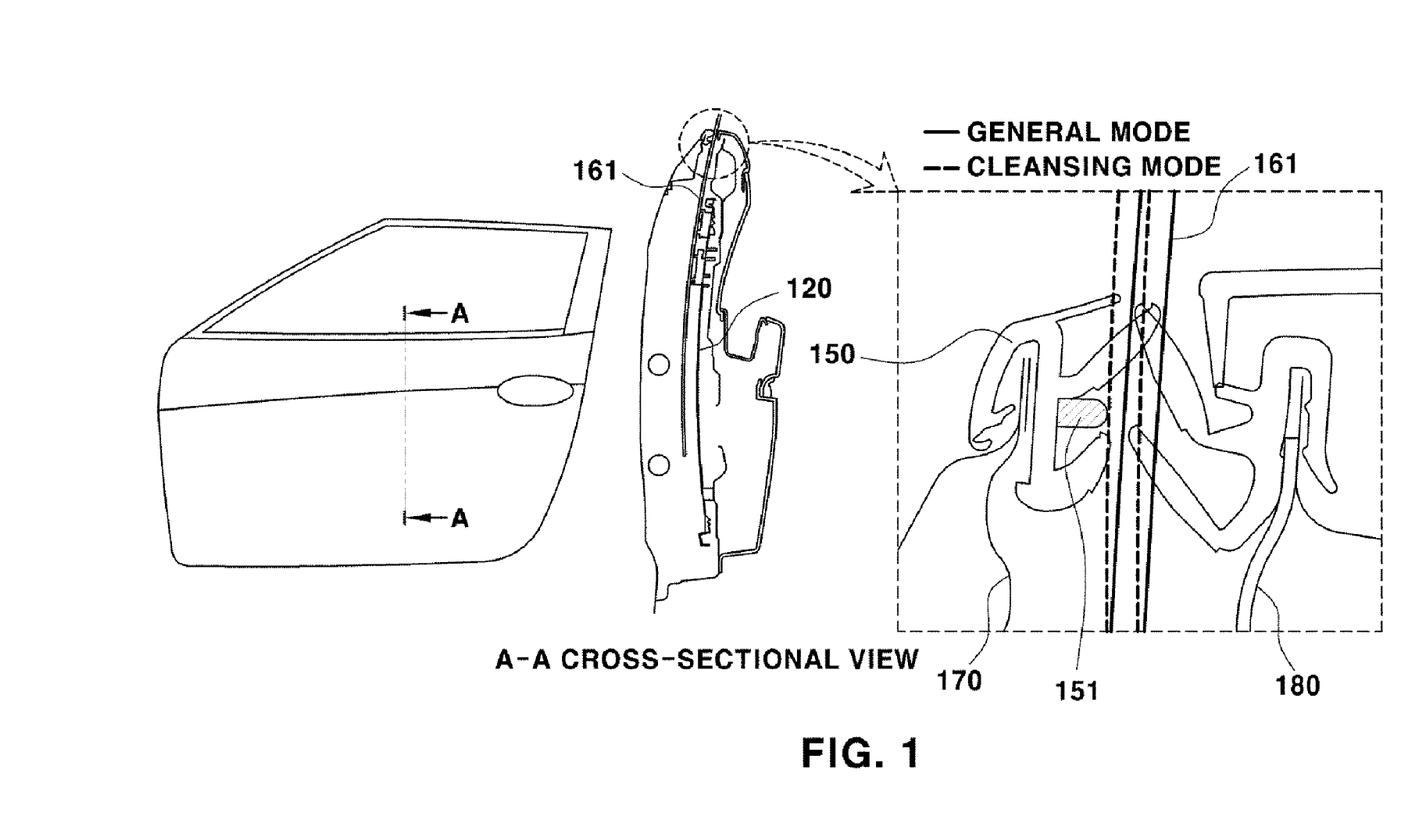
FIG. 1 is a diagram schematically showing an operation mode of an exemplary device for cleansing door glass of a vehicle according to the present invention.
Figure 2:
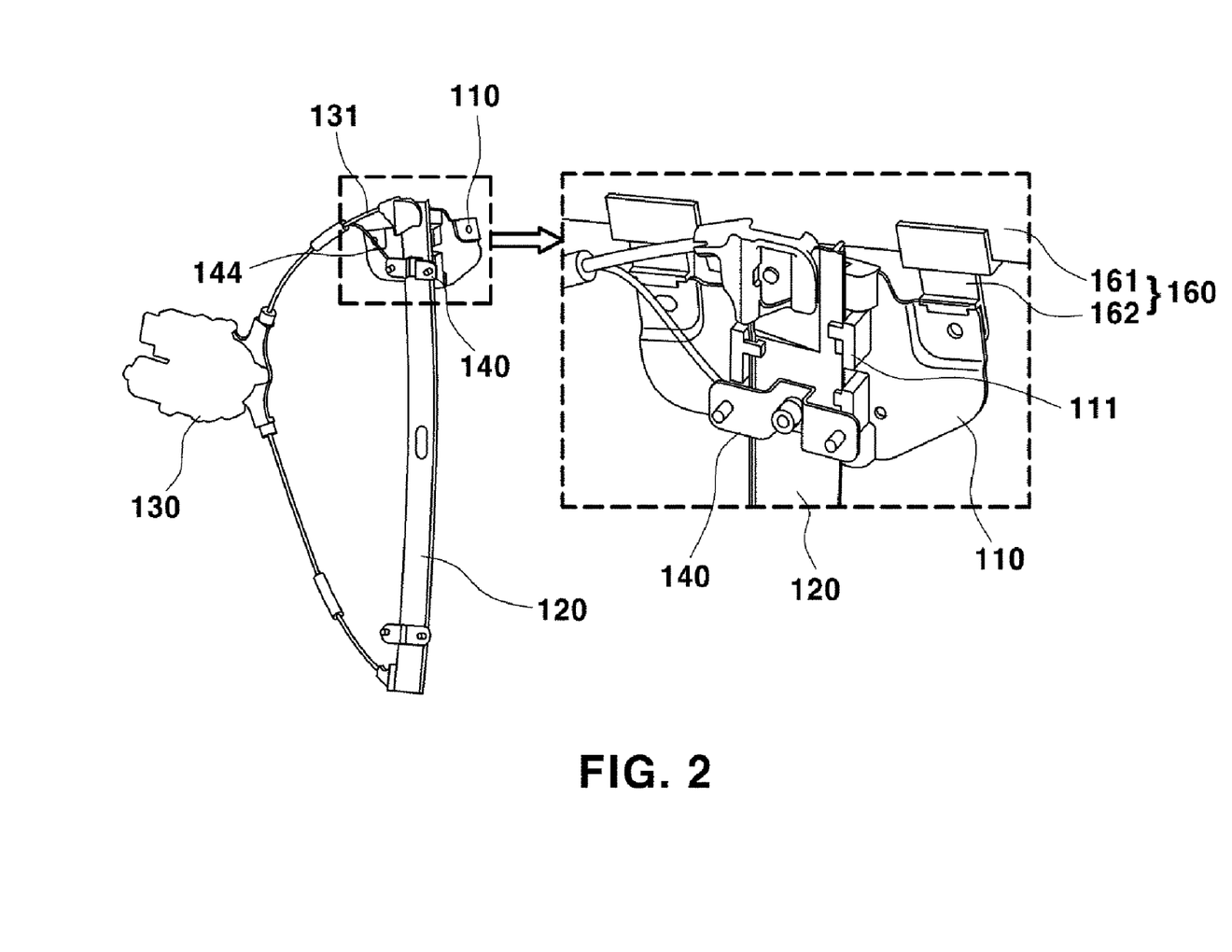
FIG. 2 is a diagram schematically showing a structure of an exemplary device for cleansing door glass of a vehicle according to the present invention.

As shown in FIGS. 1-2, a device for cleansing door glass of a vehicle according to an embodiment of the present invention may include a carrier plate 110, a guide rail 120, a regulator 130, a rail pushing module 140, and a clean protrusion 151.

The carrier plate 110 is coupled integrally to a lower end of a glass module 160 of a door of the vehicle, such that the carrier pate 110 may open and close the door glass 161 by moves up and down in the door. The glass module 160 may include the door glass 161 and a coupling member 162 for coupling the door glass 161 with the carrier plate 110.

The guide rail 120 extends up and down in the vehicle door and guides upward and downward movement of the carrier plate 110, such that the carrier plate 110 is coupled to move up and down. The carrier plate 110 is provided with a rail guide 111 for coupling the carrier plate 110 to the guide rail 120 in such a way to allow the carrier plate 110 to move up and down. The regulator 130 raises and lowers the carrier plate 110 through a wire 131 connected with the carrier plate 110. To this end, the regulator 130 receives a switch signal corresponding to a user's mode selection and drives the wire 131.

The user selects one of a general mode and a glass cleansing mode. In the general mode, only the wire 131 operates such that the door glass 161 ascends or descends while being tilted (along the original moving trajectory) toward the interior (that is, the door inner panel). In the glass cleansing mode, an electromagnet 142 of the rail pushing module 140, together with the wire 131, operates, such that the door glass 161 ascends or descends while being tilted toward the exterior (that is, the door outer panel).

In operation of the wire 131, the carrier plate 110 moves up and down along the guide rail 120, together with the door glass 161 integrally coupled to the carrier plate 110. The wire 131 is coupled with the carrier plate 110 while being supported on an upper end of the guide rail 120.

According to a user's mode selection between the general mode and the cleansing mode, in the cleansing mode, the rail pushing module 140 pushes the guide rail 120 for urging the guide rail 120 to be tilted toward the outbelt 150 of the door outer panel 170 or pulls the guide rail 120 toward the door inner panel 180 to return the guide rail 120 to the original moving trajectory of the door glass 161.

Figure 3:
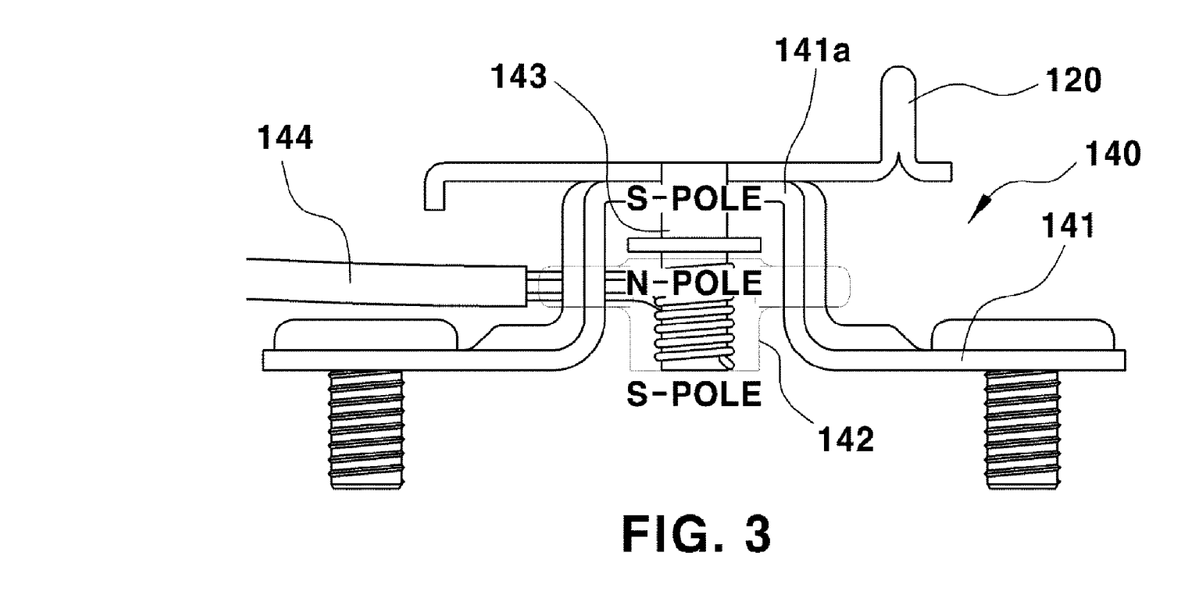
FIGS. 3 and 4 are diagrams for describing a structure and an operation scheme of an exemplary rail pushing module according to the present invention.

Referring to FIG. 3, the rail pushing module 140 may include a mounting bracket 141, an electromagnet 142, and a mounting hook 143. The mounting bracket 141 is coupled at its both side ends to the door inner panel 180 and has a bent portion 141*a* in its center or center portion to form a space with the door inner panel 180. The bent portion 141*a* protrudes toward the inside of the door (that is, the door outer panel) from the center of the mounting bracket 141 to form a space with the door inner panel 180 and to closely contact an upper portion of the guide rail 120.

The electromagnet 142 includes well-known coil and iron core to be fixedly installed inside the bent portion 141*a*, and has magnetism as current is applied to an electromagnetic driving wire 144 connected to the coil. The electromagnetic driving wire 144 is applied with a current having a different direction according to a user-selected mode. More specifically, if the user selects the cleansing mode, the electromagnetic driving wire 144 is applied with current having a flow direction for pushing the mounting hook 143.

Polarities of both sides of the electromagnet 142 change according to a direction of current applied to the electromagnetic driving wire 144. The electromagnetic driving wire 144 is applied with power supplied to the regulator 130. The electromagnetic driving wire 144 changes the direction of current applied to the coil of the electromagnet 142 according to the user-selected mode between the general mode and the cleansing mode.

The mounting hook 143 has characteristics of one of both polarities of a magnet. One side of the mounting hook 143 is attached and fixed to an upper portion of the guide rail 120 and the other side of the mounting hook 143 is engaged to the bent portion 141*a* in such a way to pass through the bent portion 141*a*. Thus, the mounting hook 143 is applied with an attractive force or a repulsive force according to a polarity of one side end of the electromagnet 142 facing the mounting hook 143.

Referring to FIG. 3, in the general mode, the one side end of the electromagnet 142 facing the mounting hook 143 has a polarity that is different from that of the mounting hook 143 to exert an attractive force to the mounting hook 143. The mounting hook 143, together with the guide rail 120, moves toward the door inner panel 180 and closely contacts the electromagnet 142.

Figure 4:
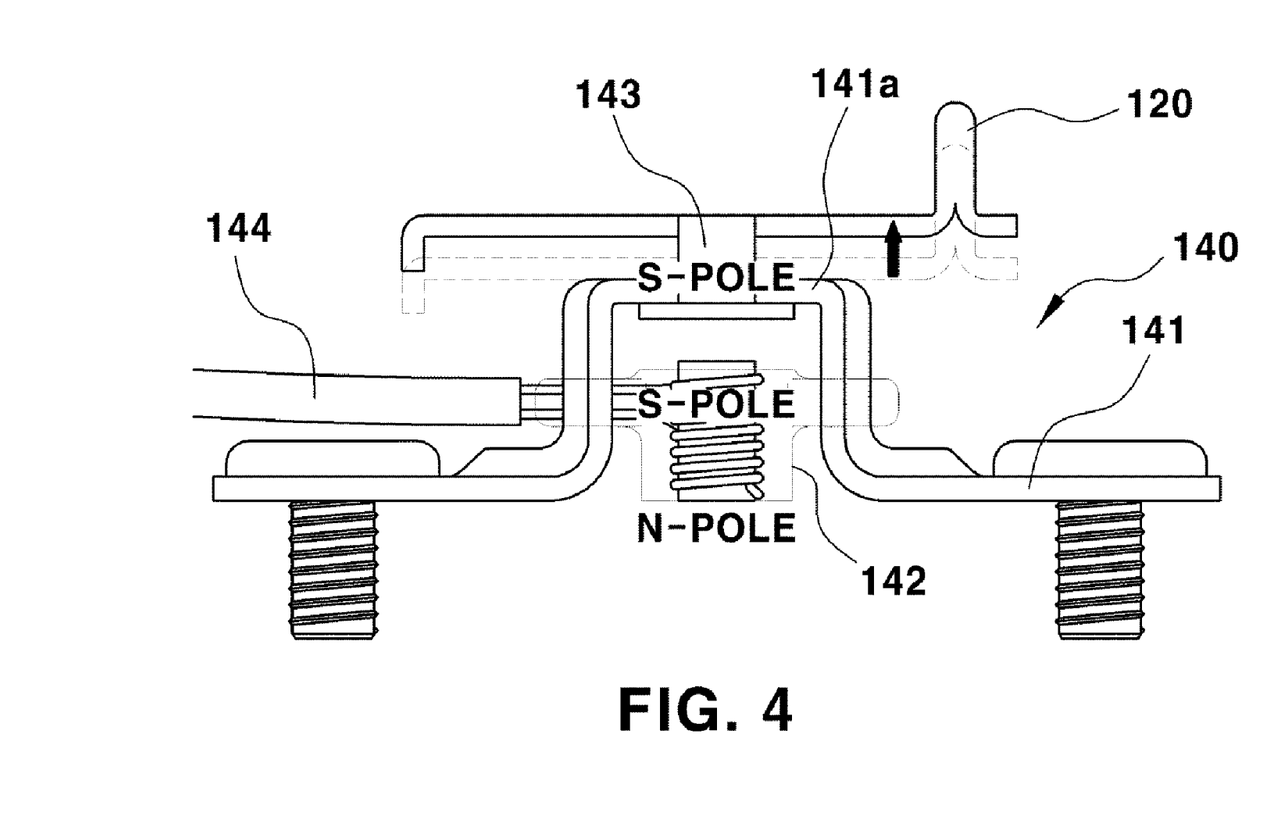

Referring to FIG. 4, in the cleansing mode, the one side end of the electromagnet 142 facing the mounting hook 143 has the same polarity as that of the mounting hook 143 to exert a repulsive force to the mounting hook 143. The mounting hook 143, together with the guide rail 120, moves toward the door outer panel 170 and thus is separated from the electromagnet 142.

As the polarity of the one side end of the electromagnet 142 facing the mounting hook 143 changes, the electromagnet 142 pushes or pulls the mounting hook 143, such that the electromagnet 142 pushes the guide rail 120 toward the door outer panel 170 or pulls the guide rail 120 toward the door inner panel 180.

As shown in FIG. 1, the outbelt 150 is installed on an upper end of the door outer panel 170 and in a center portion of the outbelt 150, the aforementioned clean protrusion 151 protrudes toward the inside of the door. Thus, as described above, in the cleansing mode, as the guide rail 120 ascends or descends while being tilted toward the door outer panel 170, the outer surface of the door glass 161 contacts the clean protrusion 151, such that contamination of the door glass 161 may be removed. In this case, the clean protrusion 151 is formed of a material and in a shape that do not damage the door glass 161.

Figure 5:
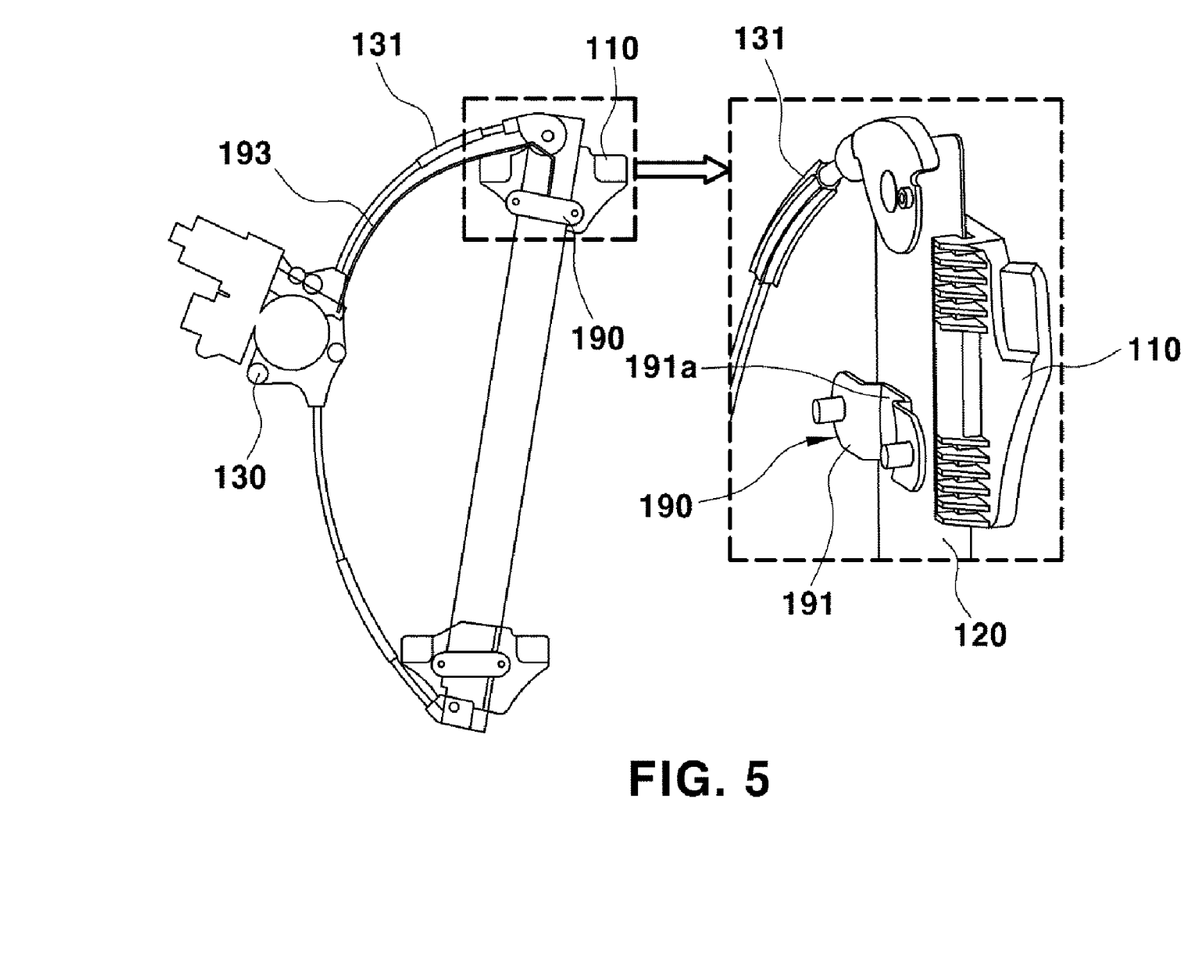
FIG. 5 is a diagram schematically showing a device for cleansing door glass of another exemplary vehicle according to the present invention.
Figure 6:
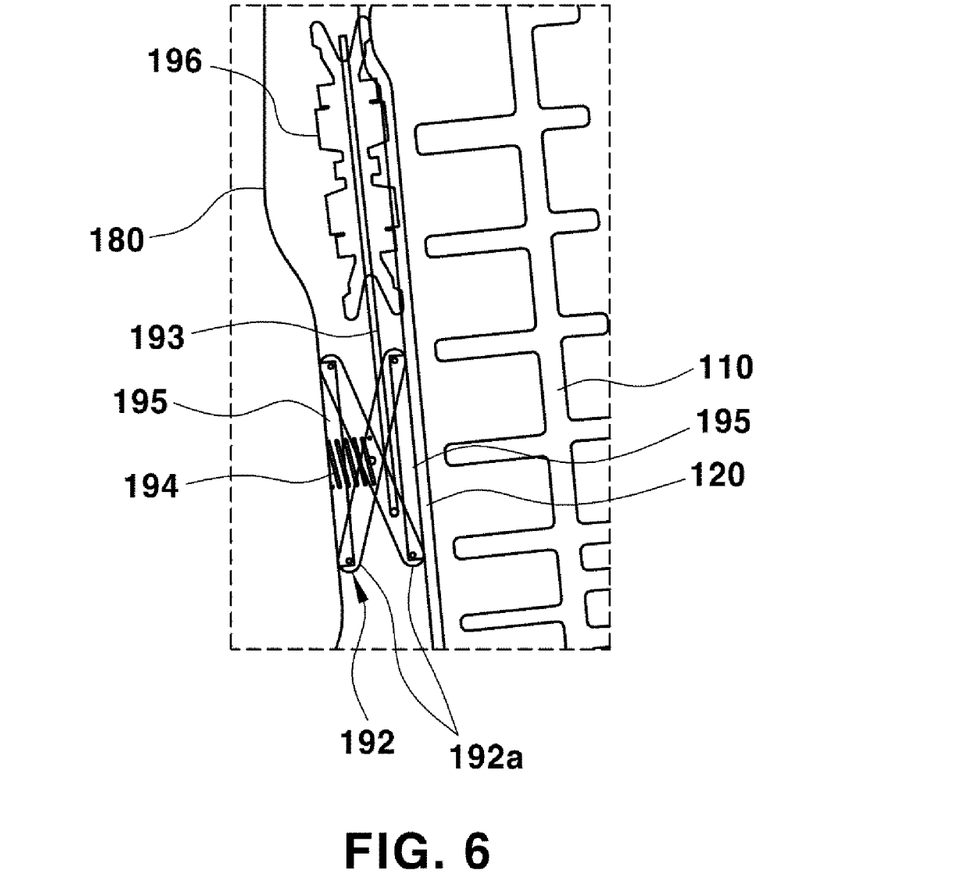
FIG. 6 is a diagram schematically showing an internal structure of another exemplary device for cleansing door glass of a vehicle according to the present invention.
Figure 7:
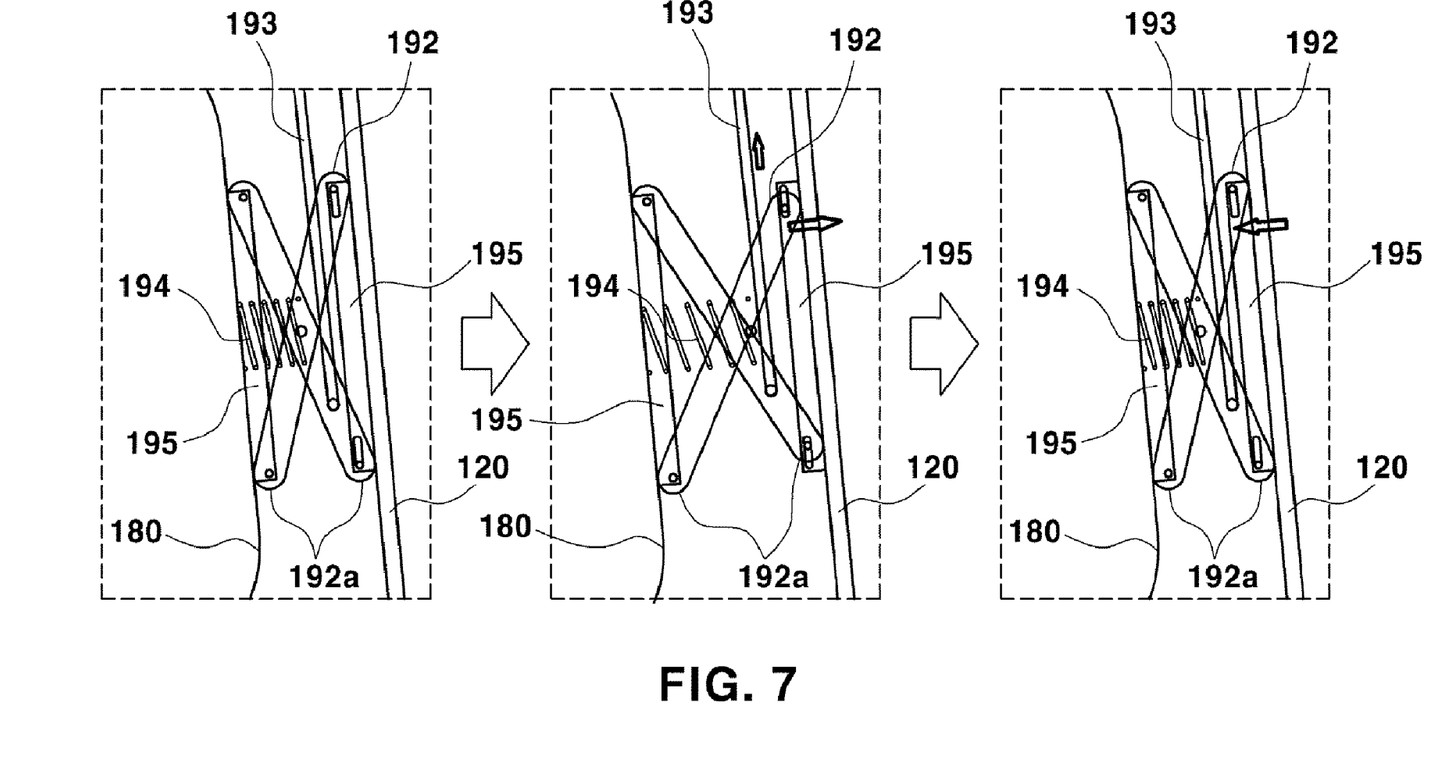
FIG. 7 is a diagram for describing an operation scheme of another exemplary rail pushing module according to the present invention.

With reference to FIGS. 5 through 7, a description will be made of a device for cleansing door glass of a vehicle according to various other embodiments of the present invention, in which a description regarding the same matters as in the previous embodiment will not be provided.

As shown in FIG. 5, the device for cleansing door glass of the vehicle according to various other embodiments of the present invention may include the carrier plate 110, the guide rail 120, the regulator 130, a rail pushing module 190, and the clean protrusion 151. As shown in FIGS. 5-6, the rail pushing module 190 according to various other embodiments of the present invention may include a mounting bracket 191, a crosslink 192, a link driving wire 193, and a return spring 194.

Both side ends of the mounting bracket 191 are coupled to the door inner panel 180, and the mounting bracket 191 has in its center a bent portion 191a that protrudes toward the inside of the door to closely contact an upper portion of the guide rail 120 and form a space with the door inner panel 180.

The crosslink 192 has a structure in which a pair of arms 192a are connected in such a way to intersect each other and thus may be extended (or stretched) and returned to the left and to the right. The crosslink 192 is installed inside the bent portion 191a of the mounting bracket 191. The crosslink 192, when installed inside the bent portion 191a, is installed such that both ends of the pair of arms 192a are supported between link guide rails 195.

The link guide rails 195 are installed in the door inner panel 180 and the mounting bracket 191, such that when the crosslink 192 operates, the link guide rails 195 support both ends of each arm 192a and guide movement of the arms 192a. In this way, when the crosslink 192 operates by being supported and guided by the link guide rails 195, the power is delivered by the link driving wire 193.

The link driving wire 193 operates with the power of a motor provided in the regulator 130 to drive the crosslink 192. To this end, the link driving wire 193 is attached to a lower end of any one or both of the arms 192a of the crosslink 192. In the cleansing mode, the link driving wire 193 is pulsed by the power of the motor of the regulator 130 to extend the crosslink 192 to the left and to the right.

As shown in FIG. 7, the extended crosslink 192 eventually pushes the guide rail 120 toward the door outer panel 170.

A return spring 194 is installed between the crosslink 192 and the door inner panel 180, and the return spring 194 is stretched as the guide rail 120 is tilted toward the door outer panel 170. As the tension of the link driving wire 193 is removed, the return spring 194 is restored to pull the guide rail 120, thus returning the guide rail 120 to the original moving trajectory of the door glass 161.

As the link driving wire 193 is pulled by the regulator 130 or restored by the restoring force of the return spring 194, the link driving wire 193 is supported by a pulley 196 provided in an upper end of the guide rail 120 and thus stably floats.

Therefore, as described before, in the cleansing mode, if the guide rail 120 ascends or descends while being tilted toward the door outer panel 170, the outer surface of the door glass 161 contacts the clean protrusion 151, thus effectively removing the contamination of the door glass 161.

As is apparent from the foregoing description, if external contamination of the door glass is serious or a distance between the outbelts of the door glass is not secured due to quality deviation of the door Body In White (BIW), the device for cleansing the door glass of the vehicle effective shows contamination removal performance for the door glass, thus improving productivity and maximizing consumer satisfaction.

Moreover, the device for cleansing the door glass of the vehicle uses common mounting conditions, and thus may be applied to any vehicle type. Simple tuning corresponding to a vehicle type, for example, adjustment of a thickness of the electromagnetic driving wire and the number of turns of the electromagnetic coil may be facilitated.

Moreover, the device for cleansing the door glass of the vehicle according to the present invention effectively removes the contaminant of the door glass, stably securing the view of the driver, enhancing driving safety, improving productivity, and thus improving consumer satisfaction.

For convenience in explanation and accurate definition in the appended claims, the terms "upper" or "lower", "inner" or 'outer", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for cleansing door glass of a vehicle, the device comprising:
   a carrier plate coupled with a glass module of a door of the vehicle;
   a guide rail, to which the carrier plate is coupled, for guiding upward and downward movement of the carrier plate;
   a rail pushing module, a side of which is coupled to a door inner panel while closely contacting an upper portion of the guide rail, the rail pushing module selectively pushing the guide rail toward a door outer panel or pulling the guide rail to return the guide rail in a glass cleansing mode;
   a regulator which moves the carrier plate upward and downward with a wire connected with the carrier plate; and a cleansing protrusion which protrudes toward an inside of the door from a center portion of an outbelt attached to an upper end of the door outer panel, wherein the rail pushing module comprises:

a mounting bracket comprising a bent portion coupled to the door inner panel and closely contacting the upper portion of the guide rail, wherein a space is positioned between the bent portion and the door inner panel;

an electromagnet which is fixedly installed inside the bent portion and to which a current of a predetermined direction is applied in the glass cleansing mode; and a mounting hook, a first portion attached to the upper portion of the guide rail and a second portion which is configured to pass through the bent portion and is engaged with the bent portion connected to the door inner panel, the mounting hook having a magnetic polarity.

2. The device of claim 1, wherein polarities of both sides of the electromagnet are changed in response to change of the direction of the current applied through an electromagnetic driving wire, and the electromagnetic driving wire changes the direction of the current applied to a coil of the electromagnet according to a user-selected mode.

3. The device of claim 1, wherein the rail pushing module comprises:

a mounting bracket comprising the bent portion which is coupled to the door inner panel, closely contacting the upper portion of the guide rail, and having the space between the bent portion and the door inner panel;

a crosslink including a pair of arms connected to intersect each other and to be extended or returned, the crosslink being installed inside the bent portion; and a link driving wire attached to a lower end of one of the pair of arms of the cross link pulled by the regulator in the glass cleansing mode.

4. The device of claim 3, wherein the rail pushing module further comprises a return spring which is installed between the crosslink and the door inner panel to restore the extended crosslink to an original position thereof.

5. The device of claim 3, wherein the rail pushing module further comprises a link guide rail installed in the door inner panel and the mounting bracket to support and guide operations of the crosslink.

* * * * *